US008122145B2

(12) United States Patent
Muhonen et al.

(10) Patent No.: US 8,122,145 B2
(45) Date of Patent: Feb. 21, 2012

(54) SYSTEM, METHOD AND COMPUTER PROGRAM PRODUCT FOR GROUPING CLIENTS AND TRANSFERRING CONTENT IN ACCORDANCE WITH THE SAME

(75) Inventors: Ahti Muhonen, Hirvihaara (FI); Antti-Pentti Vainio, Espoo (FI); Ari Hännikäinen, Turku (FI)

(73) Assignee: Nokia Corporation (FI)

( * ) Notice: Subject to any disclaimer, the term of this patent is extended or adjusted under 35 U.S.C. 154(b) by 837 days.

(21) Appl. No.: 10/847,073

(22) Filed: May 17, 2004

(65) Prior Publication Data

US 2005/0256926 A1 Nov. 17, 2005

(51) Int. Cl.
*G06F 15/16* (2006.01)
(52) U.S. Cl. .................. 709/235; 709/223; 709/231
(58) Field of Classification Search .......... 709/231, 709/223; 714/748
See application file for complete search history.

(56) References Cited

U.S. PATENT DOCUMENTS

| | | | |
|---|---|---|---|
| 6,119,143 A * | 9/2000 | Dias et al. | 709/201 |
| 6,151,696 A * | 11/2000 | Miller et al. | 714/748 |
| 6,167,038 A | 12/2000 | Hottinen et al. | |
| 6,636,887 B1 | 10/2003 | Augeri | |
| 6,704,576 B1 * | 3/2004 | Brachman et al. | 455/503 |
| 7,296,089 B2 * | 11/2007 | Krishnamurthy et al. | 709/238 |
| 7,779,086 B1 * | 8/2010 | Gammo et al. | 709/219 |
| 2002/0091849 A1 * | 7/2002 | Heo | 709/231 |
| 2002/0163933 A1 * | 11/2002 | Benveniste | 370/465 |
| 2003/0046343 A1 | 3/2003 | Krishnamurthy et al. | |
| 2005/0220064 A1 * | 10/2005 | Hundscheidt et al. | 370/342 |

FOREIGN PATENT DOCUMENTS

| | | |
|---|---|---|
| EP | 0 582 754 A1 | 2/1994 |
| JP | 2002-0037124 | 5/2002 |
| KR | 2002-0037124 A | 5/2002 |
| KR | 2004-0023504 A | 3/2004 |

OTHER PUBLICATIONS

Hundscheidt, Multi-User Multimedia Messaging Services, WO 3094534, Nov. 13, 2003, 54 pages.*
International Search Report and Written Opinion for International Appl. No. PCT/IB2005/001335, mailed Sep. 13, 2005.
Office Action from European Patent Appl. No. 05 737 821.8, dated Oct. 28, 2010.
Notice of Allowance for Korean Application No. 10-2006-7026557 dated Mar. 31, 2008.

(Continued)

*Primary Examiner* — Jeffrey Pwu
*Assistant Examiner* — Sulaiman Nooristany
(74) *Attorney, Agent, or Firm* — Alston & Bird LLP

(57) ABSTRACT

A system is provided that includes a plurality of clients and a server capable of assigning the plurality of clients to at least one group for the transfer of content to the server and/or from the server. The server is capable of assigning at least one of the clients based upon a size of the content, a transfer speed, and a probability of transferring the content without experiencing an interruption in the transfer. In this regard, the server can also be capable of collecting statistical data relating to the transfer speed and probability to thereby determine the transfer speed and probability. After assigning the clients to the group(s), at least one of the clients can be capable of downloading content from, or uploading content to, the server based upon the group(s).

50 Claims, 7 Drawing Sheets

OTHER PUBLICATIONS

Office Action for Korean Application No. 10-2006-7026557 dated Nov. 22, 2007.
Office Action for Chinese Application No. 2005800120246.4 dated Jan. 23, 2009.
Office Action for Chinese Application No. 200580020246.4 dated Apr. 4, 2008.
Office Action for Chinese Application No. 200580020246.4 dated Sep. 19, 2008.
International Preliminary Report on Pattentability for International Application No. PCT/IB2005/001335 dated Nov. 21, 2006.

* cited by examiner

SYSTEM, METHOD AND COMPUTER PROGRAM PRODUCT FOR GROUPING CLIENTS AND TRANSFERRING CONTENT IN ACCORDANCE WITH THE SAME

FIELD OF THE INVENTION

The present invention generally relates to systems and methods for transferring content and, more particularly, to systems, methods and computer program products for transferring content in accordance with a client grouping to balance the load on the transferring network.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. The proliferation of local, regional, and global networks such as the Internet has availed a sea of information to society. These networking technologies have expanded to increasingly include wireless and mobile technologies. Through these networks, information can be downloaded to desktop systems, wireless systems, mobile systems, etc. For example, information available via the Internet can now be downloaded onto mobile wireless units, such as cellular telephones, personal digital assistants (PDAs), laptop computers, etc. One such technology facilitating the transfer of Internet content to and from wireless devices is the Wireless Application Protocol (WAP), which integrates the Internet and other networks with wireless network platforms. Generally, WAP is a set of protocols that accounts for characteristics and functionality of both Internet standards and standards for wireless services. It is independent of wireless network standards, and is designed as an open standard. WAP bridges the gap between the wireline Internet paradigm and the wireless domain, to allow wireless device users to enjoy the benefits of the Internet across both platforms.

Second generation wireless service, often referred to as 2G wireless service, is a current wireless service based on circuit-switched technology. In this regard, 2G systems, such as Global System for Mobile communications (GSM) and Personal Communications Services (PCS), use digital radio technology for improved quality and a broader range of services over first generation mobile technologies. Third generation wireless service, often referred to as 3G wireless service, refers to a set of digital technologies that promises improvements in capacity, speed and efficiency by deploying new packet-based transmission methodologies between terminals and the network. Users of 3G devices and networks will have access to multimedia services such as video-on-demand, video conferencing, fast web access and file transfer. Existing and future services are, and will continue to be, provided by network servers who make services and applications available to mobile device users via the network.

An incredible amount of content, applications, services, and the like is already available for use on wireless devices. And the quantity of information that will be accessible to mobile terminals will increase significantly in the coming years, as further technological advances will continue to diminish the gap between desktop and wireless units. However, the increase in the quantity of information accessible, and the increase in the number of terminals receiving such large quantities of information, can become burdensome to the servers providing such information and the networks over which such information is transferred, particularly when a large number of terminals or terminal users request information at the same time. It would therefore be desirable to design a system and method of balancing the load on networks, and thus servers, in sending and/or receiving content, information or the like.

SUMMARY OF THE INVENTION

In light of the foregoing background, embodiments of the present invention provide a system, method and computer program product for grouping clients and transferring content in accordance with the same. In accordance with the system, method and computer program product of embodiments of the present invention, clients for downloading content from, or uploading content to, a server can be assigned to one or more groups. As explained below, the clients can be grouped in any of a number of different manners including, for example, the size of the content to be transferred, the speed of transferring the content, and a probability of transferring the content without experiencing an interruption in the transfer. And by grouping the clients, the number of clients downloading or uploading content over at least one transfer network can be at least partially balanced over a period of time.

According to one aspect of the present invention, a system is provided that includes a plurality of clients and a server capable of assigning the plurality of clients to at least one group for the transfer of content to the server and/or from the server. The server is capable of assigning at least one of the clients based upon a size of the content, a transfer speed, and a probability of transferring the content without experiencing an interruption in the transfer. In this regard, the server can also be capable of collecting statistical data relating to a transfer speed and a probability of transferring the content without experiencing an interruption in the transfer to thereby determine the transfer speed and the probability of transferring the content without experiencing an interruption in the transfer.

The server can be capable of assigning at least one of the clients to group(s) associated with at least one transfer window within which the respective client(s) are capable of transferring content to and/or from the server. For example, the server can be capable of assigning at least one of the clients to group(s) based upon a size of the group(s). Also, for example, the server can be capable of assigning at least one of the clients to group(s) such that a number of clients transferring content does not exceed a predefined number of simultaneous transfers. The server can be capable of assigning at least one of the clients to group(s) such that, during the transfer period, a number of different types of content transferred by the plurality of clients does not exceed a predefined number of different types. In addition, for example, the server can be capable of assigning at least one of the clients to group(s) such that, during the transfer period, a number of different types of content transferred by each of the respective clients does not exceed a predefined number of different types. And in yet another example, the server can be capable of assigning at least one of the clients to group(s) such that, for clients assigned to a plurality of groups, the respective clients are assigned to groups associated with non-overlapping transfer windows.

More particularly, the server can be capable of assigning at least one of the clients by first dividing a transfer period into at least one transfer window. In such an instance, the server can then determine a length of the transfer window(s) based upon the size of the content, the transfer speed, and the probability of transferring the content without experiencing an interruption in the transfer. Thereafter, the server can assign at least one of the clients to group(s), the group(s) being associated with the at least one transfer window.

Irrespective of how the server assigns at least one client to group(s), at least one of the clients can be capable of transferring content to and/or from the server based upon the group(s). In this regard, the server can be capable of determining if a current time is within at least one transfer window associated with group(s) including at least one client. And if the current time is within at least one transfer window, the server can be capable of instructing the respective client(s) to transfer content to and/or from the server. Further, the server can be capable of repeatedly determining if a current time is within at least one such transfer window at a predetermined interval. In such instances, if the respective client(s) experience an interruption in transferring the content, the server can be capable of instructing the respective client(s) to thereby permit the respective client(s) to resume transferring the content.

According to other aspects of the present invention, a server, client, method and computer program product are provided. Therefore, embodiments of the present invention provide a system, method and computer program product for grouping clients and transferring content in accordance with the same. The system, method and computer program product of embodiments of the present invention provide greater balance of server and network resources utilized in clients uploading and/or downloading content from the server across the network. In this regard, embodiments of the present invention allow the server to group the clients based upon a number of different factors, some of which can be based upon statistical data collected by the server. Therefore, the system, method and computer program product of embodiments of the present invention solve the problems identified by prior techniques and provide additional advantages.

BRIEF DESCRIPTION OF THE DRAWINGS

Figure 1:
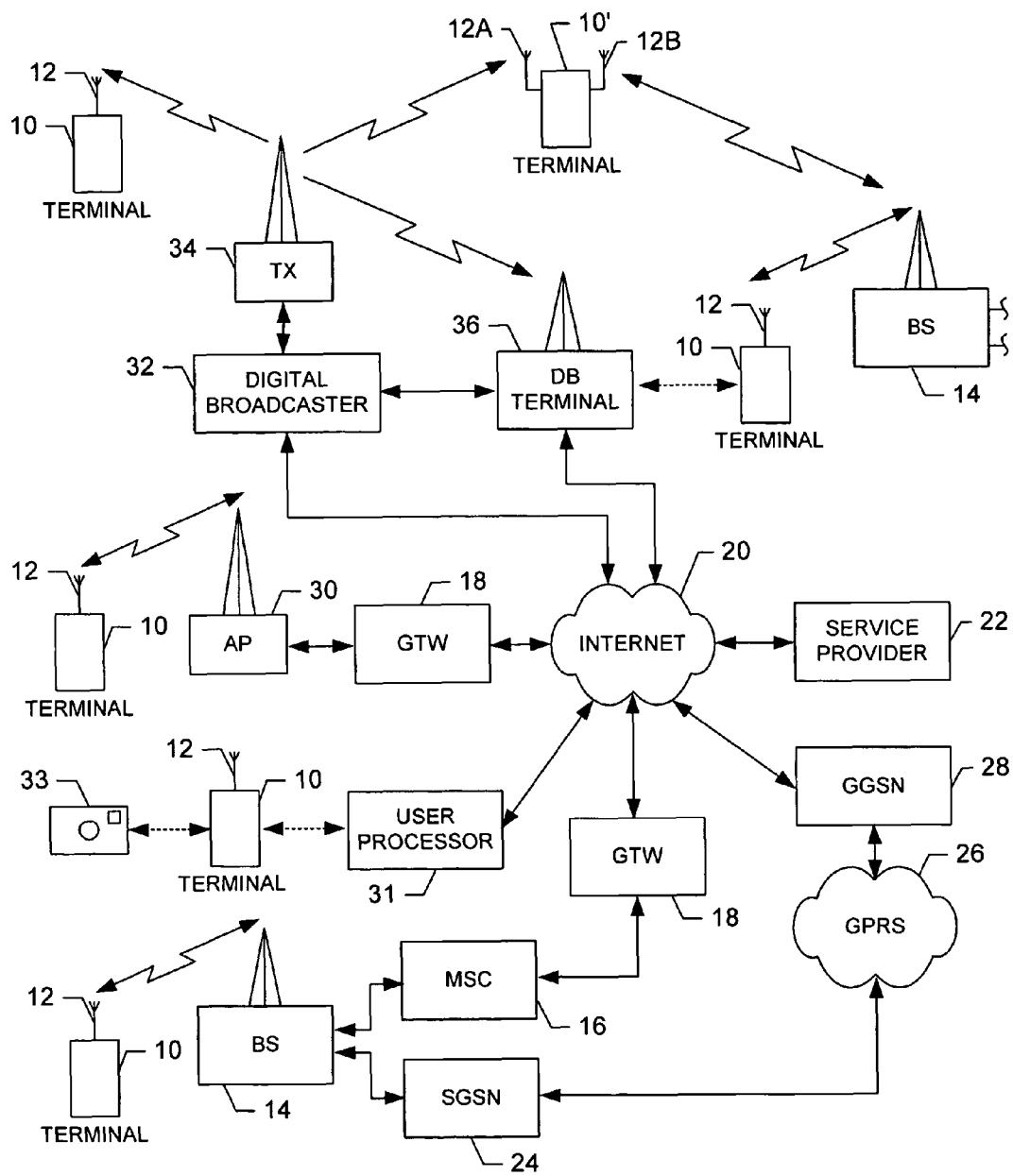
Figure 2:
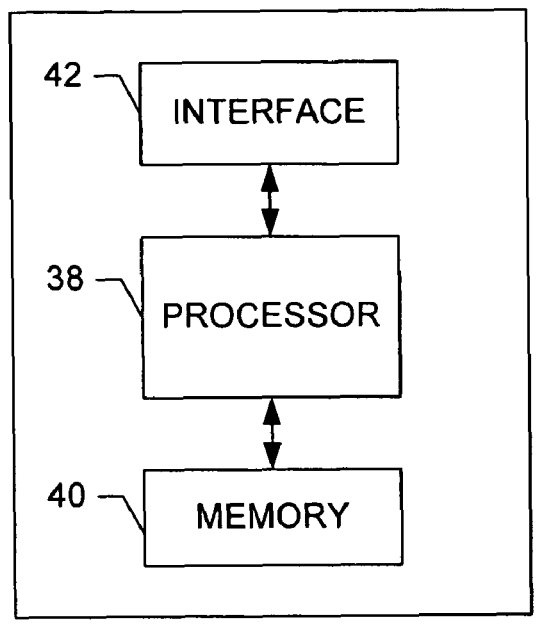
Figure 4:
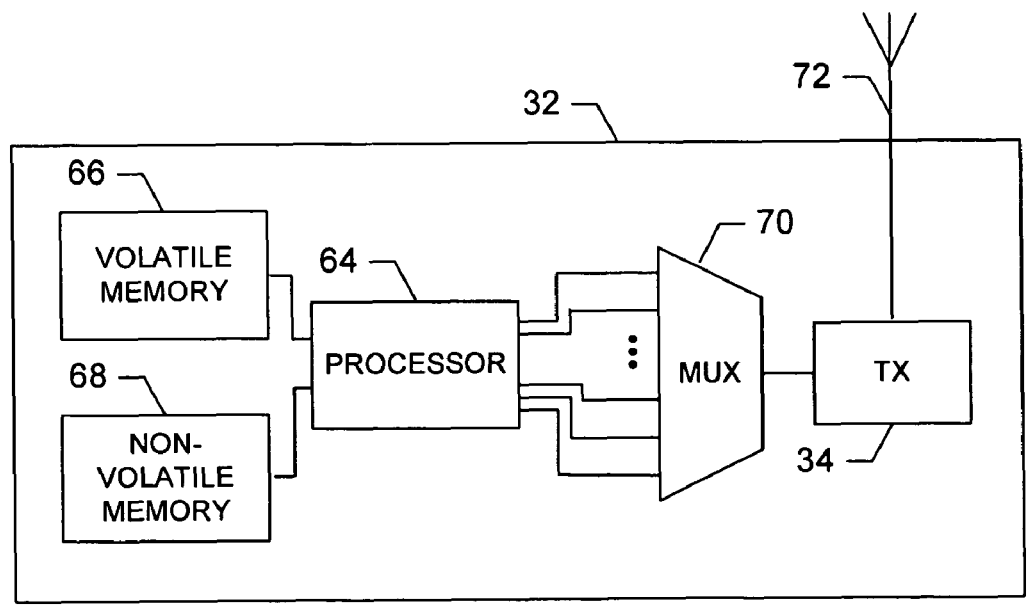
Figure 3:
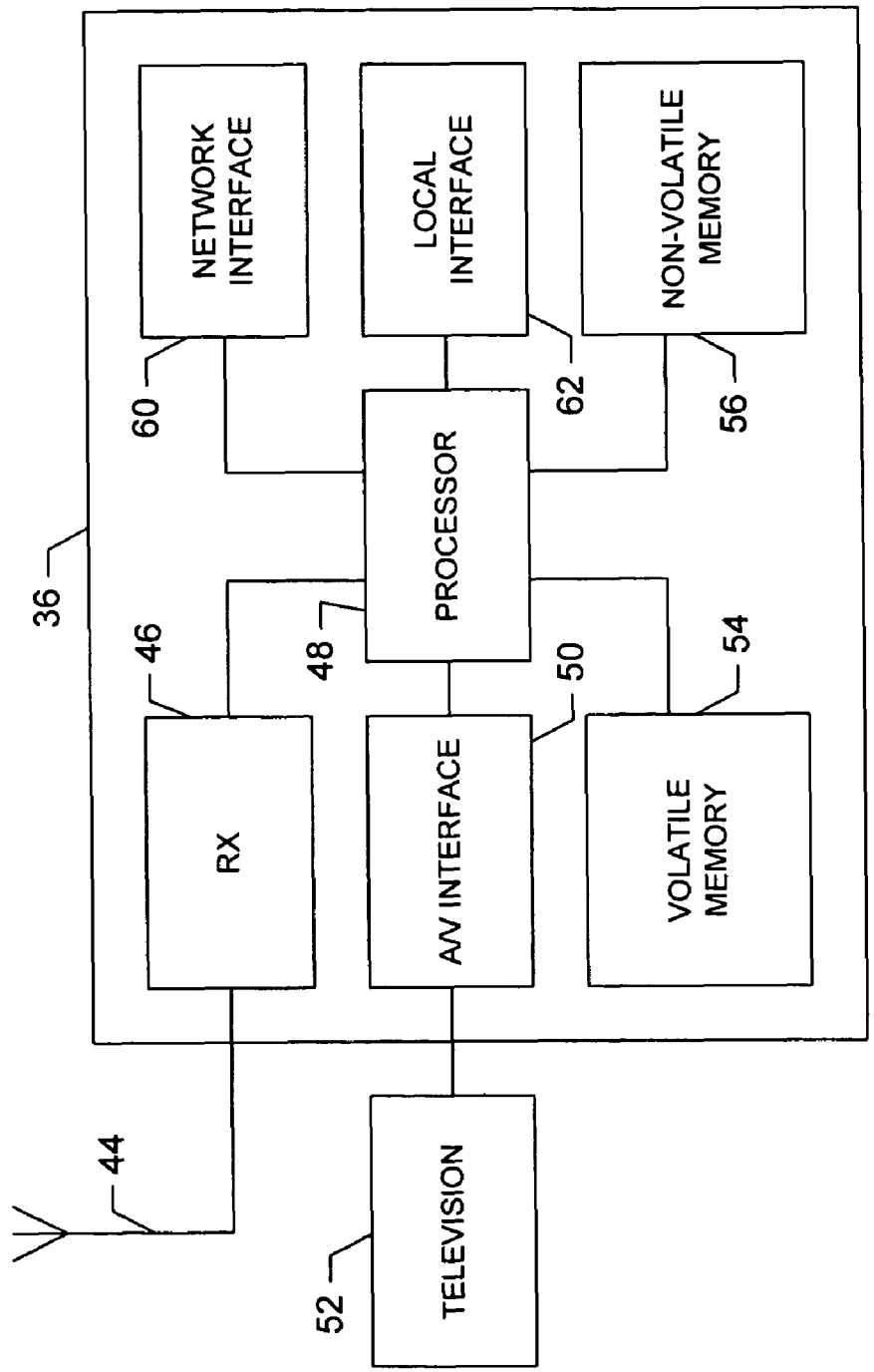
Figure 5:
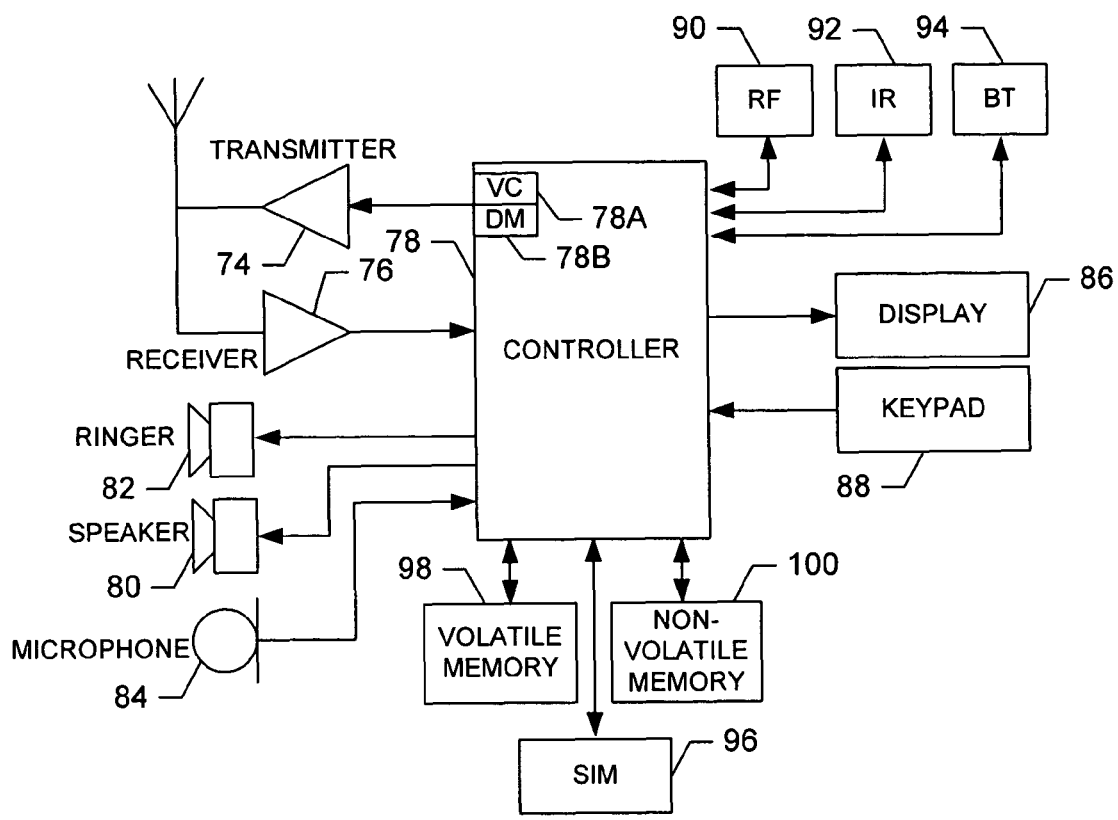
Figure 6:
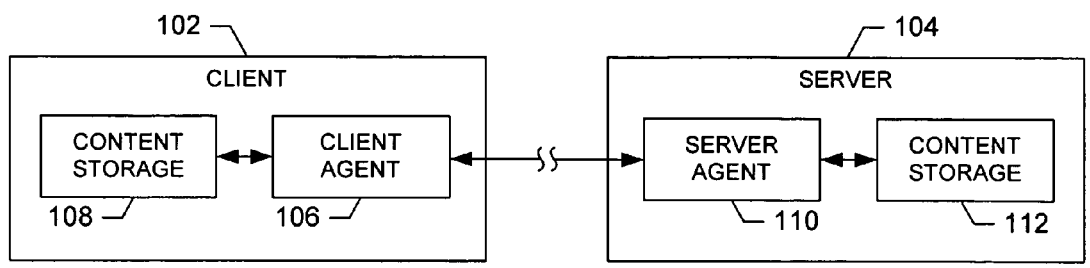
Figure 7:
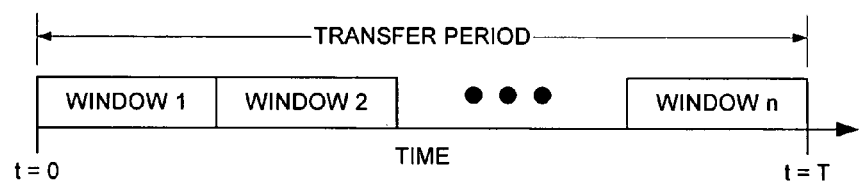
Figure 8:
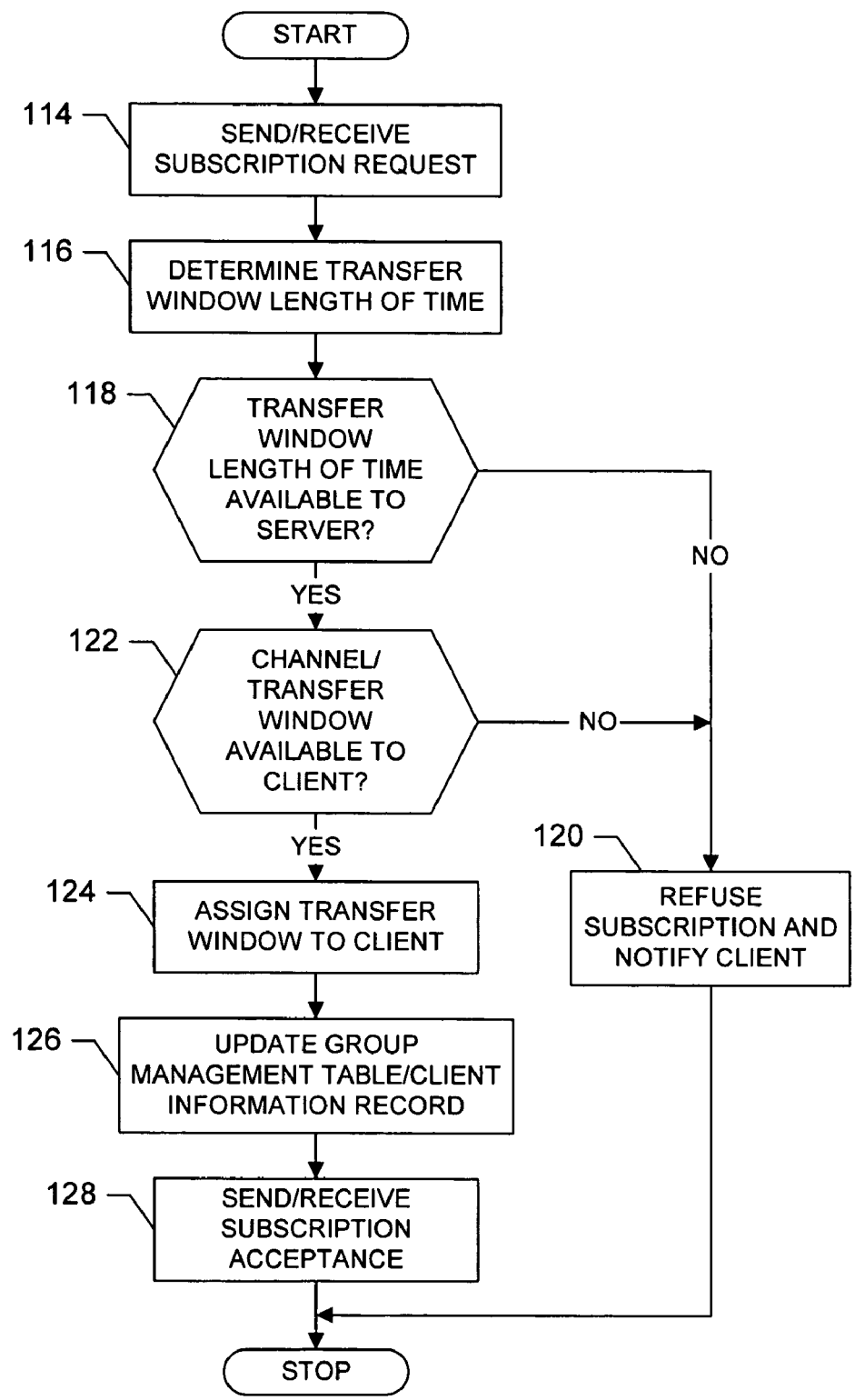
Figure 9:
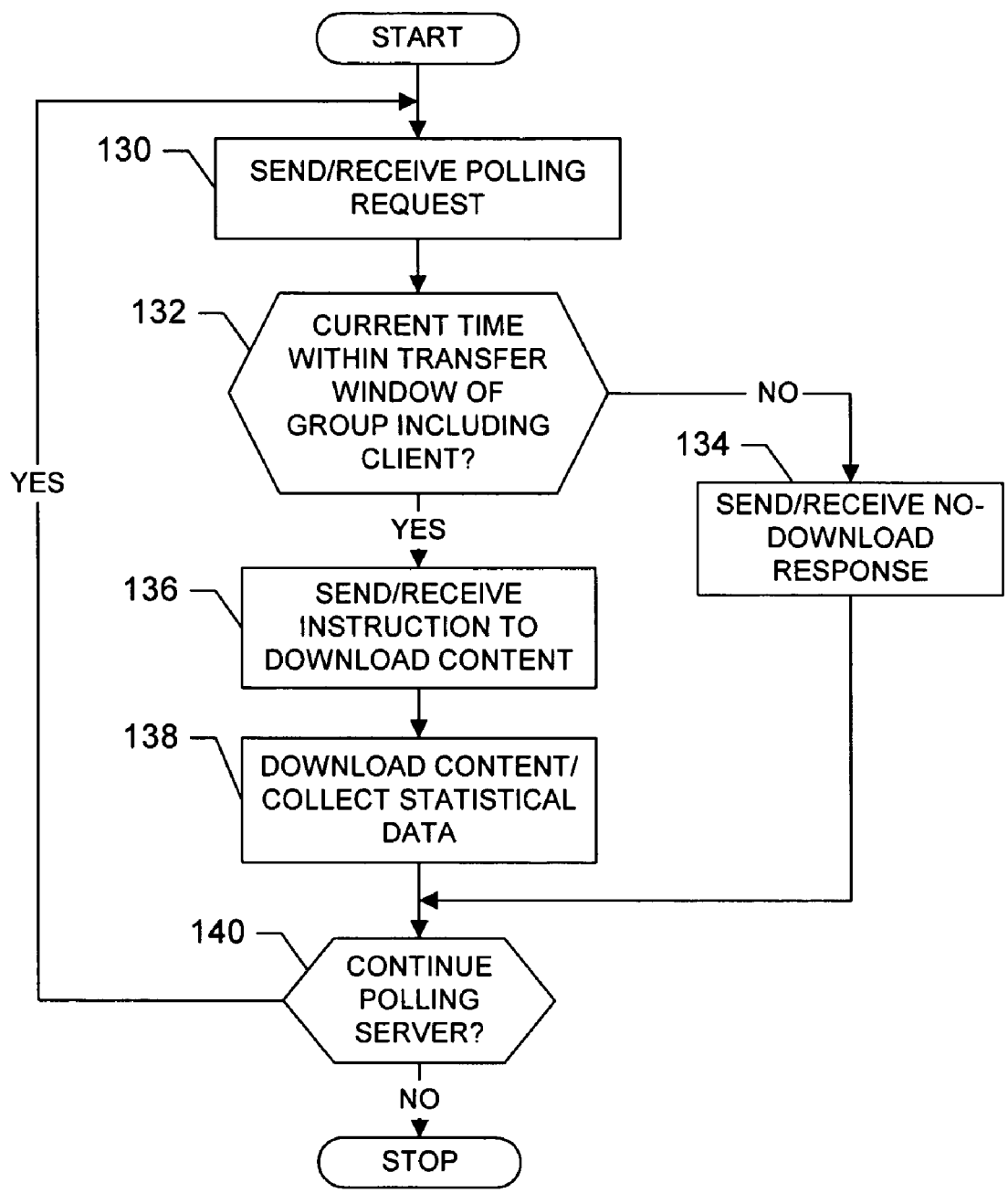

Having thus described the invention in general terms, reference will now be made to the accompanying drawings, which are not necessarily drawn to scale, and wherein:

FIG. 1 is a schematic block diagram of a wireless communications system according to one embodiment of the present invention including a cellular network and a data network to which a terminal is bi-directionally coupled through wireless RF links;

FIG. 2 is a schematic block diagram of an entity capable of operating as a terminal, service provider, digital broadcast receiver and/or a digital broadcaster, in accordance with embodiments of the present invention;

FIG. 3 is a functional block diagram of a digital broadcast receiver, in accordance with one embodiment of the present invention;

FIG. 4 is a functional block diagram of the digital broadcaster, in accordance with one embodiment of the present invention;

FIG. 5 is a schematic block diagram of a mobile station that may operate as a terminal, according to embodiments of the present invention;

FIG. 6 is a functional block diagram of a client transferring content to and/or from a server, in accordance with one embodiment of the present invention;

FIG. 7 is a schematic block diagram of a transfer period including a number of transfer windows, in accordance with an embodiment of the present invention; and FIGS. 8 and 9 are flowcharts illustrating various steps in a method of subscribing to download content from a server, and thereafter downloading the content in accordance with the subscription, in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of a cellular network that includes elements required to operate the network, such as a mobile switching center (MSC) 16. As well known to those skilled in the art, the cellular network may also be referred to as a Base Station/MSC/Interworking function (BMI). In operation, the MSC is capable of routing calls and messages to and from the terminal when the terminal is making and receiving calls. The MSC also provides a connection to landline trunks when the terminal is involved in a call. Further, the MSC can be coupled to a server gateway (GTW) 18.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 18, and the GTW is coupled to a WAN, such as the Internet 20. In turn, devices such as processing elements (e.g., personal computers, server computers or the like) can be coupled to the terminal 10 via the Internet. For example, as explained below, the processing elements can include one or more processing elements associated with an service provider 22, one of which being illustrated in FIG. 1.

In addition to the MSC 16, the BS 14 can be coupled to a signaling GPRS (General Packet Radio Service) support node (SGSN) 24. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 26. The packet-switched core network is then coupled to another GTW, such as a GTW GPRS support node (GGSN) 28, and the GGSN is coupled to the Internet.

By coupling the SGSN 24 to the GPRS core network 26 and the GGSN 28, devices such as service providers 22 can be coupled to the terminal 10 via the Internet 20, SGSN and GGSN. In this regard, devices such as service providers can communicate with the terminal across the SGSN, GPRS and GGSN. For example, service providers can provide content to the terminal, such as in accordance with the Multimedia Broadcast Multicast Service (MBMS). For more information on the MBMS, see Third Generation Partnership Project (3GPP) technical specification 3GPP TS 22.146, entitled: *Multimedia Broadcast Multicast Service (MBMS)*, the contents of which are hereby incorporated by reference in its entirety.

In addition to being coupled to the BS 14, the terminal 10 can be wirelessly coupled to one or more wireless access points (APs) 30. The APs can comprise access points configured to communicate in accordance with techniques such as, for example, radio frequency (RF), Bluetooth (BT), infrared (IrDA) or any of a number of different wireless networking techniques, including WLAN techniques. Additionally, or alternatively, the terminal can be coupled to one or more user processors 31. Each user processor can comprise a computing system such as personal computers, laptop computers or the like. In this regard, the user processors can be configured to communicate with the terminal in accordance with techniques such as, for example, RF, BT, IrDA or any of a number of different wireline or wireless communication techniques, including Universal Serial Bus (USB), LAN and/or WLAN techniques. One or more of the user processors can additionally, or alternatively, include a removable memory capable of storing content, which can thereafter be transferred to the terminal.

The terminal 10 can further be coupled to one or more portable electronic devices 33, such as digital cameras and/or other multimedia capturing, producing and/or storing devices. Like with the user processors 31, the terminal can be configured to communicate with the portable electronic devices in accordance with techniques such as, for example, RF, BT, IrDA or any of a number of different wireline or wireless communication techniques, including USB, LAN and/or WLAN techniques.

The APs 30 and user processors 31 may be coupled to the Internet 20. Like with the MSC 16, the APs and user processors can be directly coupled to the Internet. In one embodiment, however, the APs are indirectly coupled to the Internet via a GTW 18. As will be appreciated, by directly or indirectly connecting the terminals and the service provider 22, as well as any of a number of other devices, to the Internet, the terminals, as well as portable electronic devices coupled to such terminals, can communicate with one another, the service provider, etc., to thereby carry out various functions of the terminal (and portable electronic devices), such as to transmit data, content or the like to, and/or receive content, data or the like from, the service provider. As used herein, the terms "data," "content," "information" and similar terms may be used to interchangeably to refer to data capable of being transmitted, received and/or stored in accordance with embodiments of the present invention. Thus, use of any such terms should not be taken to limit the spirit and scope of the present invention.

Further, the terminal 10 can additionally, or alternatively, be coupled to a digital broadcaster 32 via a digital broadcast network, such as a terrestrial digital video broadcasting (e.g., DVB-T, DVB-H, ISDB-T, ATSC, etc.) network. As will be appreciated, by directly or indirectly connecting the terminals and the digital broadcaster, the terminals can receive content, such as content for one or more television, radio and/or data channels, from the digital broadcaster. In this regard, the digital broadcaster can include, or be coupled to, a transmitter (TX) 34, such as a DVB-T TX. Similarly, the terminal can include a receiver, such as a DVB-T receiver (not shown). The terminal can be capable of receiving content from any of a number of different entities in any one or more of a different number of manners. In one embodiment, for example, the terminal can comprise a terminal 10' capable of transmitting and/or receiving data, content or the like in accordance with a DVB (e.g., DVB-T, DVB-H, etc.) technique as well as a cellular (e.g., 1G, 2G, 2.5G, 3G, etc.) communication technique. In such an embodiment, the terminal 10' may include an antenna 12A for receiving content from the DVB-T TX, and another antenna 12B for transmitting signals to and for receiving signals from a BS 14. For more information on such a terminal, see U.S. patent application Ser. No. 09/894,532, entitled: Receiver, filed Jun. 29, 2001, the contents of which is incorporated herein by reference in its entirety.

In addition to, or in lieu of, directly coupling the terminal 10 to the digital broadcaster 32 via the TX 34, the terminal can be coupled to a digital broadcast (DB) receiver 36 which, in turn, can be coupled to the digital broadcaster 32, such as directly and/or via the TX. In such instances, the digital broadcast receiver can comprise a DVB-T receiver, such as a DVB-T receiver in the form of a set top box. The terminal can be locally coupled to the digital broadcast receiver, such as via a personal area network. In one embodiment, however, the terminal can additionally or alternatively be indirectly coupled to the digital broadcast receiver via the Internet 20.

Referring now to FIG. 2, a block diagram of an entity capable of operating as a terminal 10, service provider 22, user processor 31, digital broadcast receiver 36, and/or a digital broadcaster 32 is shown in accordance with one embodiment of the present invention. Although shown as separate entities, in some embodiments, one or more entities may support one or more of a terminal, service provider, digital broadcast receiver, and/or a digital broadcaster, logically separated but co-located within the entit(ies). For example, a single entity may support a logically separate, but co-located, terminal and digital broadcast receiver. Also, for example, a single entity may support a logically separate, but co-located digital broadcast receiver and digital broadcaster.

As shown, the entity capable of operating as a terminal 10, service provider 22, digital broadcast receiver 36, and/or a digital broadcaster 32 can generally include a processor 38 connected to a memory 40. The processor can also be connected to at least one interface 42 or other means for transmitting and/or receiving data, content or the like. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention. As explained below, the memory 40 can store a server agent capable of grouping one or more clients into one or more groups such that the clients can thereafter upload or download content to or from one or more servers in accordance with the groups. Similarly, the memory can additionally or alternatively store a client agent capable of uploading or downloading content to or from one or more servers in accordance with the groups.

Reference is now made to FIG. 3, which illustrates a functional block diagram of a digital broadcast receiver 36, in accordance with one embodiment of the present invention. As shown, the digital broadcast receiver includes an antenna 44 for receiving signals from a digital broadcaster 32 and feeding the signals into a receiver (RX) 46. In turn, the receiver is capable of decrypting, demodulating and/or demultiplexing the signals, such as to extract content data. The receiver can feed the content data to a processor 48, which can thereafter decode the content data. The processor can then feed the decoded signal into an audio/video (A/V) interface 50, which can convert signals to a form suitable for display by a monitor, such as a television set 52.

The digital broadcast receiver 36 can include volatile memory 54, such as volatile Random Access Memory (RAM) including a cache area for the temporary storage of data. The digital broadcast receiver can also include non-volatile memory 56, which can be embedded and/or may be removable. The non-volatile memory can additionally or alternatively comprise an EEPROM, flash memory, hard disk or the like. The memories can store any of a number of pieces of information, content and data, used by the digital broadcast receiver to implement the functions of the digital broadcast receiver. For example, as indicated above, the memories can store content, such as that received from a digital broadcaster 32. Also, for example, the memories can store a server agent and/or client agent capable of grouping client(s), and/or uploading or downloading content in accordance with the groups, respectively.

The digital broadcast receiver 36 can also include one or more interface means for sharing and/or obtaining data from electronic devices, such as terminals 10 and/or digital broadcasters 32. More particularly, the digital broadcast receiver can include a network interface means 60, for sharing and/or obtaining data from a network, such as the Internet 20. For example, the digital broadcast receiver can include an Ethernet Personal Computer Memory Card International Association (PCMCIA) card configured to transmit and/or receive data to and from a network, such as the Internet.

The digital broadcast receiver 36 can also include one or more local interface means 62 for locally sharing and/or obtaining data from electronic devices, such as a terminal. For example, the digital broadcast receiver can include a radio frequency transceiver and/or an infrared (IR) transceiver so that data can be shared with and/or obtained in accordance with radio frequency and/or infrared transfer techniques. Additionally, or alternatively, for example, the digital broadcast receiver can include a Bluetooth (BT) transceiver operating using Bluetooth brand wireless technology developed by the Bluetooth Special Interest Group such that the digital broadcast receiver can share and/or obtain data in accordance with Bluetooth transfer techniques. Further, the digital broadcast receiver can additionally or alternatively be capable of sharing and/or obtaining data in accordance with any of a number of different wireline and/or wireless networking techniques, including LAN and/or WLAN techniques.

Reference is now made to FIG. 4, which illustrates a functional block diagram of the digital broadcaster 32 of one embodiment of the present invention. Like the digital broadcast receiver 36, the digital broadcaster can include a processor 64 capable of carrying out the functions of the digital broadcaster. The digital broadcaster can also include volatile memory 66, such as volatile Random Access Memory (RAM) including a cache area for the temporary storage of data. The digital broadcaster can also include non-volatile memory 68, which can be embedded and/or may be removable. The non-volatile memory can additionally or alternatively comprise an EEPROM, flash memory, hard disk or the like. The memories can store any of a number of pieces of information, content and data, used by the digital broadcaster to implement the functions of the digital broadcaster. For example, as indicated above, the memories can store content, such as content for a television channel and other content for a number of other television, radio and/or data channels. Also, for example, the memories can store a server agent and/or client agent, as explained below.

The digital broadcaster 32 can also include a multiplexer 70, which can be capable of multiplexing content for a number of television, radio and/or data channels. The multiplexer can then feed the resulting signal into a TX 34, which can be separate from the digital broadcaster, as shown in FIG. 1, or incorporated within the digital broadcaster, as shown in FIG. 4. Irrespective of where the TX is located relative to the digital broadcaster, the TX can receive the signal from the multiplexer for encryption, modulation, amplification and/or transmission, such as via an antenna 72. In this regard, for example, the digital broadcaster can be capable of directly or indirectly transmitting content to a digital broadcast receiver 36 and/or a terminal 10, such as in accordance with a digital broadcasting technique, such as DVB-T. For information on DVB-T, see European Telecommunications Standards Institute (ETSI) Standard EN 300 744, entitled: *Digital Video Broadcasting (DVB): Framing structure, channel coding and modulation for digital terrestrial television*, v.1.1.2 (1997) and related specifications, the contents of which are hereby incorporated by reference in their entirety.

In accordance with a number of digital broadcasting techniques, such as DVB-T, Internet Protocol (IP) Datacast (IPDC) can be utilized to provide audio, video and/or other content to terminals 10. In this regard, the digital broadcaster 32 can be capable of providing IP datacasting content to the terminal utilizing a digital broadcasting technique. As will be appreciated by those skilled in the art, digital broadcasting techniques such as DVB-T are essentially cellular in nature with a transmission site associated with each of a number of different cells. DVB-T, for example, uses MPEG-2 transport streams, and as such, IP data can be encapsulated into DVB transmission signals sent from the digital broadcaster, or more particularly the TX 34. Data streams including IP datagrams can be supplied from several sources, and can be encapsulated by an IP encapsulator (not shown). The IP encapsulator, in turn, can feed the encapsulated IP data streams into the data broadcasting (e.g., DVB-T) network.

The encapsulated IP data streams can then be transported to one or more transmission sites, where the transmission sites form cells of the data broadcasting network. For example, the encapsulated IP data streams can be transported to one or more transmission sites on an MPEG-2 transport stream for subsequent transmission over the air directly to the terminals, or to a receiver station serving one or more terminals. As will be appreciated, the MPEG-2 transport stream, from production by the IP encapsulator, to reception by the terminals or the receiver station, is typically uni-directional in nature. In this regard, IP packets containing the data can be embedded in multi-protocol encapsulation (MPE) sections that are transported within transport stream packets.

In addition to the IP packets, the MPE sections can also include forward error correction (FEC) information and time slicing information. By including information such as time slicing information, data can be conveyed discontinuously with the receiver (e.g., terminal 10), being capable of saving battery power by switching off when no data is being transmitted to the receiver. In other terms, in accordance with one time slicing technique, instead of using the current default method of continuous digital broadcasting (e.g., DVB-T) transmission, a time division multiplex-type of allocation technique can be employed (see, e.g., DVB-H standard). With such an approach, then, services can be provided in bursts, allowing a receiver to power down when the receiver is not receiving data, and allowing the receiver to power up to receive data packets, as necessary.

FIG. 5 illustrates a functional diagram of a mobile station that may operate as a terminal 10, according to embodiments of the invention. It should be understood, that the mobile station illustrated and hereinafter described is merely illustrative of one type of terminal that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers, digital cameras and other types of voice, text and multimedia communications systems, can readily employ the present invention.

The mobile station includes a transmitter 74, a receiver 76, and a processor such as a controller 78 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first-generation (1G), second-generation (2G), 2.5G and/or third-generation (3G) communication protocols or the like. For example, the mobile station may be capable of operating in accordance with 2G wireless communication protocols IS-136 (TDMA), GSM, and IS-95 (CDMA). The mobile station can additionally or alternatively be capable of operating in accordance with any of a number of different digital broadcasting techniques, such as the DVB technique (e.g., DVB-T, ETSI Standard EN 300 744). The mobile station can also be capable of operating in accordance with any of a number of different broadcast and/or multicast techniques, such as the MBMS technique (e.g., 3GPP TS 22.146). Further, the mobile station can be capable of operating in accordance with ISDB-T, DAB, ATSC techniques or the like. Some narrow-band AMPS (NAMPS), as well as TACS, mobile stations may also benefit from embodiments of the present invention, as should dual or higher mode mobile stations (e.g., digital/analog or TDMA/CDMA/analog phones).

It is understood that the controller 78 includes the circuitry required for implementing the audio and logic functions of the mobile station. For example, the controller may be comprised of a digital signal processor device, a microprocessor device, and various analog to digital converters, digital to analog converters, and/or other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 78A, and may include an internal data modem (DM) 78B. Further, the controller may include the functionally to operate one or more software applications, which may be stored in memory.

The mobile station also comprises a user interface including a conventional earphone or speaker 80, a ringer 82, a microphone 84, a display 86, and a user input interface, all of which are coupled to the controller 78. The user input interface, which allows the mobile station to receive data, can comprise any of a number of devices allowing the mobile station to receive data, such as a keypad 88, a touch display (not shown) or other input device. In embodiments including a keypad, the keypad includes the conventional numeric (0-9) and related keys (#, *), and other keys used for operating the mobile station.

The mobile station can also include one or more means for sharing and/or obtaining data from electronic devices, such as another terminal 10, a service provider 22, an AP 30, a digital broadcast receiver 36, a digital broadcaster 32 or the like, in accordance with any of a number of different wireline and/or wireless techniques. For example, the mobile station can include a radio frequency (RF) transceiver 90 and/or an infrared (IR) transceiver 92 such that the mobile station can share and/or obtain data in accordance with radio frequency and/or infrared techniques. Also, for example, the mobile station can include a Bluetooth (BT) transceiver 94 such that the mobile station can share and/or obtain data in accordance with Bluetooth transfer techniques. Although not shown, the mobile station can include one or more ports, such as a USB port, such that the mobile station can share and/or obtain data in accordance with a number of wireline techniques, such as in accordance with a USB technique. Also not shown, the mobile station may additionally or alternatively be capable of transmitting and/or receiving data from electronic devices according to a number of different wireline and/or wireless networking techniques, including LAN and/or WLAN techniques. In this regard, as shown in FIG. 1 with respect to terminal 10', the mobile station may include an additional antenna or the like to transmit and/or receive data from such electronic devices (e.g., digital broadcaster).

The mobile station can further include memory, such as a subscriber identity module (SIM) 96, a removable user identity module (R-UIM) or the like, which typically stores information elements related to a mobile subscriber. In addition to the SIM, the mobile station can include other memory. In this regard, like the digital broadcast receiver 36 and the digital broadcaster 32, the mobile station can include volatile memory 98. Also, again like the digital broadcast receiver and the digital broadcaster, the mobile station can include other non-volatile memory 100, which can be embedded and/or may be removable. The memories can store any of a number of pieces of information, and data, used by the mobile station to implement the functions of the mobile station. For example, the memories can store content, such as that received from a service provider 22 and/or a digital broadcast receiver. Also, for example, the memories can also store client applications such as a conventional Web browser for communicating in accordance with the hypertext transfer protocol (HTTP), a file transfer (e.g., FTP) application, a Telnet application, a peer-to-peer access application, or the like. Further for example, as explained further below, the memories can store applications such as a server agent and/or client agent capable of grouping client(s), and/or uploading or downloading content in accordance with the groups, respectively.

As explained in the background section, the increase in the quantity of information accessible, and the increase in the number of terminals 10 receiving such large quantities of information, can become burdensome to servers providing such information and the networks over which such information is transferred. And as will be appreciated, when a large number of terminals or terminal users request information at the same time the burden on the servers and transferring networks can become significant. Thus, in accordance with embodiments of the present invention, a plurality of clients (e.g., terminals, service providers 22, user processors 31, digital broadcast receivers 36, digital broadcasters 32, etc.) can be grouped into one or more groups such that the number of clients downloading or uploading content from or to a server (e.g., terminal, service provider, user processor, digital broadcast receiver, digital broadcaster) over at least one transfer network is at least partially balanced over a period of time.

Reference is now drawn to FIG. 6, which illustrates a functional block diagram of a client 102 uploading or downloading content to or from a server 104, in accordance with one embodiment of the present invention. As shown, the client is capable of operating an application, such as a client agent 106, which is capable of uploading or downloading one or more piece(s) of content, and thereafter storing the content in a content storage 108 in memory (e.g., non-volatile memory 100) of the client. The server, on the other hand, is capable of operating a server agent 110, which is capable of grouping the client with one or more other clients such that the client downloads the content in accordance with the grouping. In this regard, the server agent can also be capable of communicating with the client agent to direct the client agent to download content from a content storage 112 associated with the server.

As shown and described herein, the client agent 106 comprises software operated by the client 102, and the server agent 110 comprises software operated by the server 104. It should be understood, however, that the client agent and/or server agent can alternatively comprise firmware or hardware, without departing from the spirit and scope of the present invention. Also, although the client agent is shown and described as being local to the client, the client agent can alternatively be distributed from, and in communication with, the client, such as across the Internet 20. Likewise, the server agent can be located local to or distributed from the server.

The system, method and computer program product of embodiments of the present invention will now be described in more detail with respect to clients 102 downloading content from a server 104. As also described, clients comprise terminals 10 downloading content for one or more television, radio and/or data channels from a server comprising a digital broadcaster 32. It should be understood, however, that the clients are equally applicable to uploading content to the server, without departing from the spirit and scope of the present invention. Also, it should be understood that the content can comprise any of a number of different types of pieces of content capable of being downloaded or uploaded to or from a server, each content for each channel being representative of a type of one or more pieces of content.

In addition, a client 102 can comprise any entity (e.g., terminal 10, service provider 22, user processor 31, digital broadcast receiver 36, digital broadcaster, etc.) functioning to upload or download content to or from a server. A server 104, on the other hand, can comprise any entity (e.g., terminal, service provider, digital broadcast receiver, digital broadcaster, etc.) functioning to send content to a client downloading content from the entity, or functioning to receive content from a client uploading content to the entity. As will be further appreciated, although functionally operating in different manners, the same entity can, at different times, function as a client, server, or both a client and a server.

In accordance with embodiments of the present invention, the server agent 110 is capable of grouping clients 102 such that the number of clients downloading content from the server 104 is at least partially balanced over a period of time. As described herein, the period of time can extend from time t=0 to time t=T, and can be referred to as the transfer period. For example, to facilitate the clients downloading content for one or more television, radio and/or data channels, the transfer period can be defined as the period of time between 00:00 and 05:00, where the clients and server, and/or the transfer network, experience reduced activity.

If so desired, to facilitate balancing the number of clients 102 downloading content from the server 104, the server agent 110 can divide the transfer period into a number, n, of periods of time, as shown in FIG. 7, where each period of time can be referred to as a transfer window. The transfer windows can be configured in any of a number of different manners, but in one embodiment, the transfer windows are configured such that at least one client can be capable of completely downloading one or more piece(s) of content entirely within a transfer window. In this regard, whereas the length of transfer windows can differ for different pieces of content, the transfer windows for a given piece of content can have the same length. In this regard, the number and length of the transfer windows can be determined in any of a number of different manners. In one embodiment, for example, the number of the transfer windows is set such that all of the transfer windows fit entirely within the transfer period, or in other words, such that the transfer period is at least as long as the total length of all of the transfer windows. The length of the transfer windows on the other hand can be determined, for example, based upon the size of the content to be downloaded.

Additionally or alternatively, for example, the length of the transfer windows can be determined based upon the download speed supported by the clients 102, server 104 and/or transfer network(s) over which the content is downloaded. In this regard, the server agent 110 can receive or otherwise collect statistical data sufficient to determine a mean download speed of the content from the server to the clients over the transfer network(s), such as based upon previous downloads of the same or similar content utilizing the same or similar clients, the server and transfer network(s). As will be appreciated, for a transfer period defined during reduced client, server and/or network activity, because clients are typically not mobile during such a transfer period, the server agent can be capable of differentiating between download speeds in different portions of the transfer network(s) by collecting respective statistical data, even though the server agent may not be aware of the topology or capabilities of the network(s).

The length of the transfer windows can be further determined based upon a probability of the clients 102, and thus the server 104, experiencing an error or interruption in downloading the content. In this regard, such a probability can be determined, for example, based upon the number of bytes of content the clients are typically capable of downloading without experiencing an error or interruption in the download. The respective number of bytes of content can be determined in any of a number of different manners, such as from statistical data received or otherwise collected by the server agent 110, where the statistical data can be based upon previous downloads of the same or similar content utilizing the same or similar clients, the server and transfer network(s). Irrespective of how the length of the transfer windows is determined, it should be appreciated by those skilled in the art that the length, and thus the number, of transfer windows can differ for different pieces of content, particularly for those pieces of content having different sizes.

As an example of a technique for determining the length of the transfer windows, consider content having a size filesize, and a mean download time of timeDL. In such an instance, the time, SDT (solid download time), required to download the content, presuming the content can be downloaded without an error or interruption, can be determined based upon the size of the content and the mean download time, i.e., SDT=fileSize/timeDL. Further, consider that the client can typically download a mean number of bytes, byteSucc, of content without experiencing an error or interruption. Also, as explained in greater detail below, consider that the server agent 110 can instruct the client agent 106, or client agent can repeatedly request an instruction from the server agent (i.e., poll the server agent), to download the content at a predetermined interval. In such an instance, the length of the transfer windows can be determined further based upon byteSucc and the interval. More particularly, the length of the transfer windows, window, can be determined as follows: window=SDT+(SDT/byteSucc)×interval.

Irrespective of how the number and length of the transfer windows within the transfer period are determined, the server agent 110 can be capable of grouping the clients 102. More particularly, in one embodiment, the server agent can be capable of grouping the clients based upon the content to be downloaded and a transfer window within which to download that content. For purposes of illustration, presume that clients can request to download different content from one or more of three data channels, namely Channels A, B and C, where each data channel includes a transfer period divided into a number of transfer windows. In such an instance, the server agent can group clients into groups, each having an associated data channel and transfer window within the data channel. As will be appreciated, each client can be included within more than one group, each having a different associated channel. However, because each client will typically not download the content for any given channel more than once in a given transfer period, any given client is typically not included within more than one group associated with different transfer windows of the same channel. Likewise, although clients can be capable of downloading different types of content such as from more than one channel at any given time, clients are typically not included within multiple groups associated with overlapping transfer windows.

More particularly, consider a group management table capable of being maintained by the server agent 110, an example of which is shown below. As shown, the group management table illustrates three channels such as three television, radio and/or data channels, each channel representative of different content. The transfer period over which to download content from these three channels is between 00:00 and 05:00, and the length of the transfer windows has been determined as follows: window$_A$=01:15, window$_B$=01:00 and window$_C$=01:40. With the transfer window length and the transfer period, it can be shown that the transfer period includes four windows for Channel A, five windows for Channel B, and three windows for Channel C, as shown in the group management table.

| Group Management Table | | |
|---|---|---|
| Channel A: | | |
| Group A1 | Window 1: | 00:00-01:15 |
| | Client Count: | 150 |
| Group A2 | Window 2: | 01:15-02:30 |
| | Client Count: | 156 |

-continued

| Group Management Table | | |
|---|---|---|
| Group A3 | Window 3: | 02:30-03:45 |
| | Client Count: | 141 |
| Group A4 | Window 4: | 03:45-05:00 |
| | Client Count: | 155 |
| Channel B: | | |
| Group B1 | Window 1: | 00:00-01:00 |
| | Client Count: | 1200 |
| Group B2 | Window 2: | 01:00-02:00 |
| | Client Count: | 1190 |
| Group B3 | Window 3: | 02:00-03:00 |
| | Client Count: | 1350 |
| Group B4 | Window 4: | 03:00-04:00 |
| | Client Count: | 1300 |
| Group B5 | Window 5: | 04:00-05:00 |
| | Client Count: | 1250 |
| Channel C: | | |
| Group C1 | Window 1: | 00:00-01:40 |
| | Client Count: | 900 |
| Group C2 | Window 2: | 01:40-03:20 |
| | Client Count: | 800 |
| Group C3 | Window 3: | 03:20-05:00 |
| | Member Count: | 850 |

As also shown in the group management table, the server agent 110 can group clients 102 requesting to download content from the respective channels into a group associated with the respective channels and, typically, one of the transfer windows of the respective channel. For example, as shown, the server agent can group 150 clients into Group A1 associated with the first transfer window of Channel A, 156 clients into Group A2 associated with the second transfer window of Channel A, 141 clients into Group A3 associated with the third transfer window of Channel A, and 155 clients into Group A4 associated with the fourth transfer window of Channel A. Similarly, the server agent can group clients requesting to download content from Channels B and C into groups associated with one of the transfer windows of Channels B and C, respectively.

As indicated above, a client will typically not be a member of more than one group associated with a given channel such as, for example, Groups A1 and A2. However, a client may be a member of more than one group associated with more than one channel. Also, a client is typically not included within multiple groups associated with overlapping transfer windows. In this regard, in addition to the group management table, the server agent 110 can maintain, for one or more clients, a client information record, an example of which is shown below. As shown, the client information record can include a client identification, such as the International Mobile Subscriber Identity (IMSI) of a terminal client. The client information record can also include one or more other pieces of client information such as, for example, statistical data relating to the download speeds previously achieved by the client, and numbers of bytes previously downloaded by the client without experiencing an error or interruption. In addition, the client information record can include the groups to which the respective client belongs for downloading content requested by the client. As shown, for example, the client can belong to Group 1 of Channel A (i.e., Group A1), Group 4 of Channel B (i.e., Group B4), and Group 1 of Channel C (i.e., Group C1).

| Client Information Record |
|---|
| Client Identification: XXX<br><other client information><br>Requested Content<br>    Channel A: Group 1<br>    Channel B: Group 4<br>    Channel C: Group 1 |

For a particular channel, the server agent 110 can group the clients 102 into groups associated with one of the transfer windows in any of a number of different manners. For example, the server agent can assign each client based upon the number of clients already within each group, such as by assigning each client to the group including the fewest number of clients. Additionally or alternatively, for example, the server agent can assign one or more clients such that, at any given time, the number of clients downloading content from the server 104 does not exceed a predefined number of simultaneous downloads. Also, for example, the server agent can assign one or more clients such that, during the transfer period, the number of channels downloaded by the clients does not exceed a predefined number of channels, and/or that the number of channels downloaded by any one client does not exceed a predefined number of channels. In addition, for example, the server agent can group clients based upon other, existing groups including the respective client. In this regard, the server agent can group clients such that the client is not associated with a transfer window that overlaps the transfer windows associated with other, existing groups including the respective client. Further, for example, the server agent can assign one or more clients based upon a priority ranking of the transfer windows of a respective channel. More particularly, the server agent can assign higher priority transfer windows, such as those providing more expeditious download of the respective content, to more preferred clients, as defined by the server or server agent.

After the server agent 110 has placed a client 102 in one or more groups for one or more different piece(s) of content, such as content for one or more channels, the client can be capable of downloading content from the server 104 in accordance with the groupings. For example, the client, or more particularly the client agent 106, can download the content by periodically polling the server agent at a predetermined interval (e.g., interval as explained above) for instances in which the current time is within a transfer window associated with one or more groups including the client. Alternatively, the server agent can periodically instruct the client agent as to whether the current time is within a transfer window associated with group(s) including the client. The client agent can poll the server agent, or the server agent can instruct the client agent, in any of a number of different manners over any of a number of different network(s), including the same or different network(s) than the transfer network(s) over which the content is subsequently downloaded from the server.

Irrespective of whether the server agent 110 responds to a polling of the client agent 106, or instructs the client agent, if the server agent indicates to the client agent that the current time is within a transfer window associated with group(s) including the client 102, the client agent can proceed to download the content (e.g., content from the respective channel) associated with the respective group(s) from the server 104. And as will be appreciated, since the client can be a member of more than one group, the client agent can continue to poll the server agent, or receive instructions from the server agent, as to whether the current time is within a transfer window associated with group(s) including the client, with the client downloading such content accordingly.

As will be appreciated, in various instances the client 102, and thus the server 104, may experience an error or other interruption in the transfer of content from the server to the client. As such, as explained above, the length of the transfer window can be determined to account for the probability of the client, and thus the server, experiencing an error or interruption in downloading the content. In this regard, presuming a client experiences an interruption in downloading content, the interval over which the client agent 106 polls the server agent 110, or receives instructions from the server agent, can be set such that, after the interruption, the client agent can receive (in response to a poll or an instruction from the server) another indication that the current time is within the respective transfer window to thereby permit the client agent to resume downloading the content.

It should also be appreciated that in various instances the client 102 is unable to complete the download of content within the respective transfer window. For example, the client may be unable to complete the download of content within the respective transfer window in instances where the predetermined interval, over which the client agent 106 is capable of receiving an indication that the current time is within the respective transfer window, is set such that the client agent does not poll the server agent, or the server agent does not instruct the client agent, during the transfer period or the respective transfer window(s), such as when either the client or the server is inoperative during the respective polling or instructing instances. Also, for example, the client may be unable to complete the download of content within the respective transfer window in instances where the size of the content or the download speed of the client decrease or are at a state below that necessary to download the content within the respective transfer window. In addition, for example, the client may be unable to complete the download of content within the respective transfer window in instances when the client experiences an interruption in downloading the content and cannot resume the download with sufficient time to complete the download before the end of the transfer window.

Irrespective of the nature of the instances in which the client 102 is unable to complete the download of content within the respective transfer window, in such instances the client agent 106 and server agent 110 can respond in any of a number of different manners. For example, the server agent can interrupt the client in downloading the content. Alternatively, for example, the server agent can proceed to permit the client agent to download the content, where the client agent receives indications that the current time is either within or after the respective transfer window for content not yet downloaded, thereby permitting the client agent to download the content even after the respective transfer window has expired. In yet another alternative, for example, the server agent can designate an overflow transfer window, during which the server agent can instruct the client agent to download, or continue downloading, the respective content.

As will also be appreciated, the length of the transfer windows, and thus the groupings of the clients 102, may change over time, such as when an increased number of clients request content or the number of clients requesting content decreases. Thus, the server agent 110 can be capable of maintaining the lengths of the transfer windows and updating the lengths over time. For example, at one or more instances of time, the server agent can re-determine the size of requested content. Additionally or alternatively, the server agent can re-determine the download speed from statistical data determined based upon the most recent previous downloads of the same or similar content utilizing the same or similar clients, the server and transfer network(s). Further, for example, the server agent can re-determine the probability of the clients, and thus the server, experiencing an error or interruption in downloading the content, which can be determined based upon the most recent previous downloads. From the re-determined size of the requested content, download speed and/or probability of experiencing an error, the server agent can again determine the length of the transfer windows, and adjust the length as necessary.

In addition, in various instances it may be desirable to group clients 102 such that the clients download content in accordance with the grouping independent of a transfer period or transfer window. In such instances, the server agent 110 can group the clients in any of a number of different manners, such as based upon the size (or channel) of the content to be downloaded, the download speed supported by the clients, server 104 and/or transfer network(s), and/or the probability of the clients, and thus the server, experiencing an error or interruption in downloading the content, each of which being described above with respect to determining the length of transfer windows. As such, the server agent can group clients requesting to download the same or similar content, supporting the same or similar download speed (and/or are requesting content from a sever over transfer network(s) supporting the same or similar download speeds), and/or the same or similar probabilities of experiencing an error or interruption in downloading the content.

Also, for example, as explained above with respect to grouping clients 102 into groups associated with transfer windows, the server agent 110 can group the clients based upon the number of clients already within each of a number of groups, the number of clients downloading content from the server 104 (such as to maintain a predefined maximum number of simultaneous downloads), the number of different piece(s) of content or channels downloaded by the clients (such as to maintain a predefined maximum number of different piece(s) or channels, and/or to maintain a predefined maximum number of piece(s) of content or channels downloaded by any one client). In addition, for example, the server agent can further group clients based upon other, existing groups including the respective client. Further, for example, the server agent can group the clients based upon a priority ranking of the transfer windows of a respective channel. For example, the server agent can assign higher priority groups, such as those being permitted to download content at preferred times or over preferred transfer network(s), to more preferred clients, as defined by the server or server agent.

Reference will now be made to FIGS. 8 and 9, which illustrate various steps in the operation of clients 102 and a server 104 performing a method of grouping clients and transferring (i.e., downloading or uploading) content, in accordance with one embodiment of the present invention. For purposes of illustration, the steps in performing the method will be described in the context of clients subscribing to download content for one or more television, radio and/or data channels from a server. In this regard, in accordance with the subscriptions, the server has designated a transfer window between 00:00 and 05:00 for downloading content for the channels, where the server agent 110 of the server maintains a group management table and client information record for those clients subscribing to download content from the server, such as in a manner described above.

As shown in block 114 of FIG. 8, a method of grouping clients includes a client 102, or more particularly the client agent 106 of a client, sending a subscription request to download content for one or more channels, and a server 104, or more particularly the server agent 110 of a server, receiving the subscription request. Then, as shown in block 116, the server agent can determine a transfer window length of time for the client to download the content from the server, such as in the manner described above. The server agent can determine if the length of time of the transfer window is available in the system (i.e., across the clients downloading content from the server) based upon information contained within the group management table. In this regard, the server agent can determine if the length of time of the transfer window is available to thereby insure that, at any given time during the transfer period, the number of clients downloading content from the server does not exceed a predefined number of simultaneous downloads, as shown in block 118.

If the length of time of the transfer window is not available in the system, the server agent 110 can respond in any of a number of different manners. As shown in block 120, for example, the server agent can refuse the subscription request. Additionally, the server agent can notify the client 102 of the subscription refusal, and can also indicate the reason for such refusal (i.e., insufficient server resources within transfer period). If the length of time of the transfer window is available in the system, the server agent can then determine if the channel and/or the length of time of the transfer window to download the channel are available to the client based upon information contained within a client information record associated with the respective client (presuming the client has previously subscribed to content from one or more channels), as shown in block 122. In this regard, the server agent can determine if the channel and/or length of time of the transfer window are available to thereby insure that the number of channels downloaded by the client over the transfer period does not exceed a predefined number of channels, and/or to insure that, at any given time during the transfer period, the client is not a member of a group associated with a transfer window that overlaps the transfer windows associated with another, existing group including the respective client.

If the channel and/or the length of time of the transfer window to download the channel are not available to the client, the server agent 110 can respond in any of a number of different manners. For example, again as shown in block 120, the server agent can refuse the subscription request, and notify the client 102 of the subscription refusal, and can also indicate the reason for such refusal (i.e., insufficient client resources within transfer period). If the channel and/or the length of time of the transfer window to download the channel are available to the client, however, as shown in block 124, the server agent can assign the client to a group downloading content from the respective channel within a transfer window for downloading such content, such as in the manner described above. As shown in block 126, upon assigning the client, the server agent can update the group management table and client information record (presuming the client has a client information record, otherwise, the server agent can create a client information record) accordingly. Additionally, the server agent can send, and the client agent 106 can receive, a subscription acceptance, as shown in block 128.

At any point after a client 102 has subscribed to download content for a channel, the client agent 106 can send, and the server agent 110 can receive, a polling request relating to downloading content for the channel, as shown in block 130 of FIG. 9. Upon receiving the polling request, as shown in block 132, the server agent can determine if the current time is within a transfer window associated with a group including the client, as such information can be determined based upon information contained within the group management table and the client information record of the respective client. If the current time is not within a respective transfer window, the server agent can respond by sending, and the client agent receiving, a response indicating that the current time is not within a transfer window for the client to download the content, as shown in block 134.

If the current time is within a respective transfer window, however, the server agent 110 can respond by sending, and the client agent 106 receiving, an instruction to download content from the channel associated with the group also associated with the respective transfer window, as shown in block 136. The client agent can then proceed to download the respective content from the server 104, or more particularly from the content storage 112 of the server. As the client agent downloads the content, the client agent can store the content in the content storage 108 of the client 102. Also, as the client agent downloads the content, the server agent can collect statistical data relating to the download, such as statistical data relating to the download speed achieved by the client, and numbers of bytes downloaded by the client without experiencing an error or interruption.

As and/or after the client agent 106 downloads the content, the client agent can again send, and the server agent 110 can again receive, a polling request, as shown in block 140. The technique can then repeat with the client agent repeatedly polling the server agent, such as at a predetermined interval. In this regard, the client agent can be capable of downloading content for a number of different channels. In addition, as explained above, in instances where the client experiences an interruption in downloading the content, the client agent can again poll the server agent within the transfer window to continue the download.

As explained above, the length of the transfer windows, and thus the groupings of the clients 102, may change over time, such as when an increased number of clients subscribe to download content. Likewise, for example, the length of the transfer windows and groupings of the clients may change when clients unsubscribe to download content, thereby decreasing the number of clients downloading content from the server 104. Thus, at one or more times during operation of the system, the server agent can update the information contained within the group management table and client information records, such as by re-determining the size of the content of the channels, the download speeds of the clients, and/or the probability of the clients, and thus the server, experiencing an error or interruption in downloading the content.

According to one aspect of the present invention, all or a portion of the system of the present invention, such all or portions of the clients 102 (e.g., terminal 10) and/or servers 104 (e.g., digital broadcaster 32), generally operates under control of a computer program product (e.g., client agent 106, server agent 110, etc.). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 8 and 9 are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the flowcharts. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the flowcharts.

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
a plurality of clients, wherein each client comprises a device configured to repeatedly poll a server; and
the server configured to assign a client within the plurality of clients to a group within a plurality of groups, and assign the client a transfer window associated with the group for a transfer of content including an upload or download of content to the server or from the server, the transfer window being a period of time within which the assigned client is permitted to upload or download content to the server or from the server in response to the polling of the server by the client within the transfer window, the transfer window being one of a plurality of defined transfer windows that include at least one other transfer window that is not assigned to the client, wherein the server is configured to assign the client to the group and transfer window based upon a size of the content, a transfer speed, and a probability of transferring the content without experiencing an interruption in the transfer, and
wherein the server comprises a device and is configured to direct the client to upload or download the content in accordance with the group to which the client is assigned by indicating to the client that a current time is within the transfer window for the client in response to the polling by the client being within the transfer window.

2. A system according to claim 1, wherein the server is also configured to collect statistical data relating to the transfer speed and the probability of transferring the content without experiencing an interruption in the transfer to thereby determine the transfer speed and the probability of transferring the content without experiencing an interruption in the transfer.

3. A system according to claim 1, wherein the server is configured to assign the client to the group based upon a size of the group.

4. A system according to claim 1, wherein the server is configured to assign the client to the group such that a number of clients uploading or downloading content does not exceed a predefined number of simultaneous uploads or downloads.

5. A system according to claim 1, wherein a transfer period includes the transfer window, and wherein the server is configured to assign the client to the group such that, during the transfer period, a number of different types of content uploaded or downloaded by the plurality of clients does not exceed a predefined number of different types.

6. A system according to claim 1, wherein a transfer period includes the transfer window, and wherein the server is configured to assign the client to the group such that, during the transfer period, a number of different types of content uploaded or downloaded by a number of clients does not exceed a predefined number of different types.

7. A system according to claim 1, wherein the server is further configured to assign the client to a second group with an associated non-overlapping transfer window.

8. A system according to claim 1, wherein the server being configured to assign the client includes being configured to divide a transfer period into a plurality of transfer windows including the transfer window, determine a length of the transfer window as a function of the size of the content, the transfer speed, and the probability of transferring the content without experiencing an interruption in the transfer, and assign the client to the group according to the transfer window associated with the group.

9. A system according to claim 1, wherein the client is configured to upload or download the content to the server or from the server in accordance with the group to which the clients is assigned.

10. A system according to claim 1, wherein the server is configured to repeatedly determine if a current time is within the transfer window associated with the group including the client at a predetermined interval such that, if the client experiences an interruption in the upload or download of the content, the server is configured to direct the client to thereby permit the client to resume the upload or download of the content.

11. An apparatus comprising at least one processor and at least one memory storing instructions, the at least one memory and the instructions configured to, with the at least one processor, cause the apparatus to at least:
assign a client within a plurality of clients to a group within a plurality of groups, wherein the apparatus is configured to repeatedly polled by the client, and
assign the client to a transfer window associated with the group for a transfer of content including an upload or download of content to the apparatus or from the apparatus, the transfer window being a period of time within which the assigned client is permitted to upload or download content to the apparatus or from the apparatus in response to a polling of the apparatus by the client within the transfer window, the transfer window being one of a plurality of defined transfer windows that include at least one other transfer window that is not assigned to the client, wherein the apparatus is caused to assign the client to the group and the transfer window based upon a size of the content, a transfer speed, and a probability of transferring the content without experiencing an interruption in the transfer, and
wherein the apparatus is caused to direct the client to upload or download the content in accordance with the group to which the client is assigned by indicating to the client that a current time is within the transfer window for the client in response to the polling by the client being within the transfer window.

12. An apparatus according to claim 11, wherein the apparatus is further caused to collect statistical data relating to the transfer speed and the probability of transferring the content without experiencing an interruption in the transfer to thereby determine the transfer speed and the probability of transferring the content without experiencing an interruption in the transfer.

13. An apparatus according to claim 11, wherein the apparatus is caused to assign the client to the group based upon a size of the group.

14. An apparatus according to claim 11, wherein the apparatus is caused to assign the client to the group such that a number of clients uploading or downloading content does not exceed a predefined number of simultaneous uploads or downloads.

15. An apparatus according to claim 11, wherein a transfer period includes the transfer window, and wherein the apparatus is caused to assign the client to the group such that, during the transfer period, a number of different types of content uploaded or downloaded by the plurality of clients does not exceed a predefined number of different types.

16. An apparatus according to claim 11, wherein a transfer period includes the transfer window, and wherein the apparatus is caused to assign the clients to at least one group such that, during the transfer period, a number of different types of content uploaded or downloaded by a number of clients does not exceed a predefined number of different types.

17. An apparatus according to claim 11, wherein the apparatus is further caused to assign the client to a second group with an associated non-overlapping transfer window.

18. An apparatus according to claim 11, wherein the apparatus caused to assign the clients includes being caused to divide a transfer period into a plurality of transfer windows including the transfer window, determine a length of the transfer windows as a function of the size of the content, the transfer speed, and the probability of transferring the content without experiencing an interruption in the transfer, and assign the client to the group according to the transfer windows associated with the group.

19. An apparatus according to claim 11, wherein the apparatus is caused to assign the client such that the client is configured to upload or download content to the apparatus or from the apparatus in accordance with the group to which the clients is assigned.

20. An apparatus according to claim 11, wherein the apparatus is caused to repeatedly determine if a current time is within the transfer window associated with the group including the client at a predetermined interval such that, if the client experiences an interruption in the upload or download of the content, the apparatus is caused to direct the client to thereby permit the client to resume the upload or download of the content.

21. An apparatus comprising at least one processor and at least one memory storing instructions, the at least one memory and the instructions configured to, with the at least one processor, direct the apparatus to at least:
cause repeated polling of a server by the apparatus, the polling being a request to transfer content, including an upload or download of content to the server or from the server, and receive, in response thereto, direction from the server to upload or download the content in accordance with at least one group and an associated transfer window, the direction from the server being an indication from the server that a current time is within the transfer window for the apparatus in response to the polling by the apparatus being within the transfer window, the transfer window being one of a plurality of defined transfer windows that include at least one other transfer window that is not assigned to the apparatus, the transfer window being an assigned period of time within which the apparatus is permitted to upload or download content to the server or from the server in response to the polling of the server by the apparatus within the transfer window, the transfer window being assigned based upon a size of the content, a transfer speed, and a probability of transferring the content without experiencing an interruption in the transfer.

22. An apparatus according to claim 21, wherein the apparatus caused to receive direction from the server includes being caused to receive direction from the server, the server having also collected statistical data relating to the transfer speed and the probability of transferring the content without experiencing an interruption in the transfer to thereby determine the transfer speed and the probability of transferring the content without experiencing an interruption in the transfer.

23. An apparatus according to claim 21, wherein the apparatus caused to receive direction from the server includes being caused to receive direction from the server having assigned the apparatus to the group based upon a size of the group.

24. An apparatus according to claim 21, wherein the apparatus caused to receive direction from the server includes being caused to receive direction from the server, the server having assigned the apparatus to the group such that a number of apparatuses uploading or downloading content does not exceed a predefined number of simultaneous uploads or downloads.

25. An apparatus according to claim 21, wherein a transfer period includes the transfer window, and wherein the apparatus caused to receive direction from the server includes being caused to receive direction from the server, the server having assigned the apparatus to the group such that, during the transfer period, a number of different types of content uploaded or downloaded by the plurality of apparatuses does not exceed a predefined number of different types.

26. An apparatus according to claim 21, wherein a transfer period includes the transfer window, and wherein the apparatus caused to receive direction from the server includes being caused to receive direction from the server, the server having assigned the apparatus to the group such that, during the transfer period, a number of different types of content uploaded or downloaded by the apparatus does not exceed a predefined number of different types.

27. An apparatus according to claim 21, wherein the apparatus is further caused to be assigned by the server to a second group with an associated non-overlapping transfer window.

28. An apparatus according to claim 21, wherein the apparatus caused to receive direction from the server includes being caused to receive direction from the server, the server having divided a transfer period into a plurality of transfer windows including the transfer window, determine a length of the transfer window as a function of the size of the content, the transfer speed, and the probability of transferring the content without experiencing an interruption in the transfer, and assign the apparatuses to the groups according to the transfer windows associated with the group.

29. An apparatus according to claim 21, wherein the apparatus caused to upload or download the content to the server or from the server in accordance with the group to which the server has assigned the apparatus.

30. An apparatus according to claim 21, wherein the apparatus caused to receive direction from the server includes being caused to receive direction from the server, the server being configured to repeatedly determine if a current time is within the transfer window associated with the group including the apparatus at a predetermined interval, such that if the apparatus experiences an interruption in the upload or download of the content, the apparatus is caused to receive the direction to thereby permit the apparatus to resume uploading or downloading the content.

31. A method comprising:
assigning, by a processor configured to make an assignment, a client within a plurality of clients to a group within a plurality of groups, wherein the client is configured to repeatedly poll a server;
assigning the client to a transfer window associated with the group for a transfer of content including an upload or download of content to the server or from the server, the transfer window being a period of time within which the client is permitted to upload or download content to the server or from the server in response to a polling of the server by the client within the transfer window, the transfer window being one of a plurality of defined transfer windows that include at least one other transfer window that is not assigned to the client, wherein assigning the client to the transfer window comprises assigning the client to the transfer window based upon a size of the content, a transfer speed, and a probability of transferring the content without experiencing an interruption in the transfer; and
directing the client to upload or download the content in accordance with the group to which the client is assigned by indicating to the client that a current time is within the transfer window for the client in response to the polling by the client being within the transfer window.

32. A method according to claim 31 further comprising:
collecting statistical data relating to the transfer speed and the probability of transferring the content without experiencing an interruption in the transfer to thereby determine the transfer speed and the probability of transferring the content without experiencing an interruption in the transfer.

33. A method according to claim 31, wherein assigning the client comprises assigning the client to the group based upon a size of the group.

34. A method according to claim 31, wherein assigning the client comprises assigning the client to the group such that a number of clients uploading or downloading content does not exceed a predefined number of simultaneous uploads or downloads.

35. A method according to claim 31, wherein a transfer period includes the transfer window, and wherein assigning the client comprises assigning the client to the group such that, during the transfer period, a number of different types of content uploaded or downloaded by the plurality of clients does not exceed a predefined number of different types.

36. A method according to claim 31, wherein a transfer period includes the transfer window, and wherein assigning the client comprises assigning the client to the group such that, during the transfer period, a number of different types of content uploaded or downloaded by a number of clients does not exceed a predefined number of different types.

37. A method according to claim 31, wherein assigning the client comprises assigning the client to a second group with an associated non-overlapping transfer window.

38. A method according to claim 31, wherein assigning the client comprises:

dividing a transfer period into a plurality of transfer windows including the transfer window;

determining a length of the transfer window as a function of the size of the content, the transfer speed, and the probability of transferring the content without experiencing an interruption in the transfer; and assigning the client to the group according to the transfer window associated with the group.

39. A method according to claim 31 further comprising:

receiving or sending content from or to the client in connection with the client uploading or downloading the content, receiving or sending the content occurring in accordance with the group to which the client is assigned.

40. A method according to claim 31, wherein determining if a current time of the polling is within the transfer window occurs repeatedly at a predetermined interval such that, if the client experiences an interruption in transferring the content, directing the client includes directing the client to thereby permit the client to resume transferring the content.

41. A computer program product comprising at least one non-transitory computer-readable storage medium having computer-readable program code portions stored therein, the computer-readable program code portions comprising:

a first executable portion configured to assign a client within a plurality of clients to a group within a plurality of groups, wherein the client is configured to repeatedly poll a server, and assign the client to a transfer window associated with the group for a transfer of content including an upload or download of content to the server or from the server, the transfer window being a period of time within which the client is permitted to upload or download content to the server or from the server in response to a polling of the server by the client within the transfer window, the transfer window being one of a plurality of defined transfer windows that include at least one other transfer window that is not assigned to the client, wherein the first executable portion is configured to assign the client to the transfer window based upon a size of the content, a transfer speed, and a probability of transferring the content without experiencing an interruption in the transfer; and a second executable portion configured to direct the client to upload or download the content in accordance with the group to which the client is assigned by indicating to the client that a current time is within the transfer window for the client in response to the polling by the client being within the transfer window.

42. A computer program product according to claim 41 further comprising:

a third executable portion configured to collect statistical data relating to the transfer speed and the probability of transferring the content without experiencing an interruption in the transfer to thereby determine the transfer speed and the probability of transferring the content without experiencing an interruption in the transfer.

43. A computer program product according to claim 41, wherein the first executable portion is configured to assign the client to the group based upon a size of the group.

44. A computer program product according to claim 41, wherein the first executable portion is configured to assign the client to the group such that a number of clients uploading or downloading content does not exceed a predefined number of simultaneous uploads or downloads.

45. A computer program product according to claim 41, wherein a transfer period includes the transfer window, and wherein the first executable portion is configured to assign the client to the group such that, during the transfer period, a number of different types of content uploaded or downloaded by the plurality of clients does not exceed a predefined number of different types.

46. A computer program product according to claim 41, wherein a transfer period includes the transfer window, and wherein the first executable portion is configured to assign the client to the group such that, during the transfer period, a number of different types of content uploaded or downloaded by a number of clients does not exceed a predefined number of different types.

47. A computer program product according to claim 41, wherein the first executable portion is configured to assign the client to a second group with an associated non-overlapping transfer window.

48. A computer program product according to claim 41, wherein the first executable portion being configured to assign the client includes being configured to divide a transfer period into a plurality of transfer windows including the transfer window, determine a length the transfer window as a function of the size of the content, the transfer speed, and the probability of transferring the content without experiencing an interruption in the transfer, and assign the client to the group according to the transfer window associated with the group.

49. A computer program product according to claim 41 further comprising:

a third executable portion configured to receive or send content from or to the client in connection with the client uploading or downloading the content, the third executable portion being configured to receive or send the content in accordance with the group to which the client is assigned.

50. A computer program product according to claim 41, further comprising a third executable portion configured to repeatedly determine if a current time of the polling is within the transfer window associated with the group including the client at a predetermined interval such that, if the client experiences an interruption in transferring the content, the second executable portion is configured to direct the client to thereby permit the client to resume transferring the content.

* * * * *